(12) United States Patent
Zhong et al.

(10) Patent No.: US 7,828,878 B2
(45) Date of Patent: Nov. 9, 2010

(54) HIGH FREQUENCY PSA PROCESS FOR GAS SEPARATION

(75) Inventors: Guoming Zhong, Bellaire, TX (US); Peter James Rankin, Menomonee Falls, WI (US); Mark William Ackley, E. Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 754 days.

(21) Appl. No.: 11/717,388

(22) Filed: Mar. 13, 2007

(65) Prior Publication Data

US 2008/0134889 A1  Jun. 12, 2008

Related U.S. Application Data

(60) Provisional application No. 60/875,113, filed on Dec. 15, 2006.

(51) Int. Cl.
*B01D 53/02* (2006.01)
(52) U.S. Cl. .............................. 95/96; 95/148; 96/108
(58) Field of Classification Search ............... 95/96, 95/100, 103, 148; 96/108
See application file for complete search history.

(56) References Cited

U.S. PATENT DOCUMENTS

| | | | |
|---|---|---|---|
| 4,194,891 A | 3/1980 | Earls et al. | |
| 4,194,892 A * | 3/1980 | Jones et al. | ............ 95/95 |
| 5,122,164 A | 6/1992 | Hirooka et al. | |
| 5,891,218 A | 4/1999 | Rouge et al. | |
| 6,500,234 B1 | 12/2002 | Ackley et al. | |
| 6,551,384 B1 | 4/2003 | Ackley et al. | |
| 6,605,136 B1 | 8/2003 | Graham et al. | |

OTHER PUBLICATIONS

Glueckauf, "Theory of Chromatography", Trans. Faraday, Soc. 51 1955.
Ruthven, "Principles of Adsorption and Adsorption Processes", (1984), pp. 209-211, John Wiley & Sons.
Wankat, "Intensification of Sorption Processes", Ind. Eng. Chem, Res. (1987), pp. 1579-1585.
Kaplan et al., "Advances in the Design of Medical Oxygen Concentrators", AIChE Annual Meeting (1989).
Rota et al., "Intensification of Pressure Swing Adsorption Processes", AIChE Journal (1990), pp. 1299-1312, vol. 36, No. 9.
Coulson et al., "Fluid Flow, Heat Transfer and Mass Transfer", (1990), pp. 310-315, Butterworth—Heinemann.
Alpay et al., "Adsorbent Particle Size Effects in the Separation of Air by Rapid Pressure Swing Adsorption", Chem. Eng. Science, (1994), pp. 3059-3075, vol. 49, No. 18.

* cited by examiner

*Primary Examiner*—Robert A Hopkins
(74) *Attorney, Agent, or Firm*—Salvatore P. Pace

(57) ABSTRACT

An improved gas separation PSA process, more particularly for oxygen production, utilizing adsorbents of Type X characterized by high frequency (i.e., cycle times of less than 4 s), bed length to square of mean particle diameter ratio within 200 to 600 $mm^{-1}$, bed size factor of less than 50 lb/TPDO. The bed length, mean particle size, and cycle time are selected in a range such that axial dispersion becomes an important factor. In this way, low product recovery and high pressure drop (high power consumption) disadvantages often associated with the use of small particles are overcome.

12 Claims, 4 Drawing Sheets

HIGH FREQUENCY PSA PROCESS FOR GAS SEPARATION

RELATED APPLICATIONS

This application claims the benefit of U.S. Provisional Application No. 60/875,113, filed Dec. 15, 2006, and which is incorporated herein in its entirety.

TECHNICAL FIELD

The present invention generally relates to a pressure swing adsorption (PSA) process for gas separation utilizing high frequency adsorbents.

BACKGROUND ART

In the production of oxygen or any other gas, it is desirable to improve the performance of the PSA process and reduce operating and capital costs. One way to achieve this is to reduce the amount of adsorbent and/or reduce power consumption while maintaining high product recovery. Reducing the adsorbent particle size to improve the adsorption rate within the particle is often cited in the related art. More recently, the small particle strategy has been combined with advanced adsorbents having high intrinsic pore diffusivity to improve separation processes. Such strategies must contend with the effects of increasing pressure drop with decreasing particle size. Finally, many attempts have been made to utilize rapid pressure swing adsorption (RPSA). RPSA is characterized by relatively high pressure drop, long (deep) beds and relatively low product recovery.

U.S. Pat. No. 5,891,218 (Rouge et al.) discloses a relationship between particle size and bed thickness for optimizing the cost of a PSA air separation process. Preferred adsorbents include both Type X and Type A zeolite adsorbents for air separation. The preferred range of bed thicknesses (e.g., 0.1 m to 2.0 m) and mean particle diameter (e.g., 0.1 mm to 5.0 mm) must be selected according to the following rule: a PSA process, such that $$300 \leq L/\sqrt{d_p} \leq 1000,$$

with particle diameter ($d_p$, measured in mm) and bed thickness (L, measured in mm). Process cycle times in the range of 45 s to 90 s are disclosed.

U.S. Pat. No. 5,122,164 (Hirooka et al.) describes 6, 8 and 10-step vacuum pressure swing adsorption (VPSA) processes for separating air to produce oxygen. While the main thrust of this patent is the cycle configuration and detailed operation of the various cycle steps to improve yield and productivity, Hirooka et al. utilize small particles to achieve faster cycles. A broad particle range is specified (8×35 US mesh or 0.5 mm to 2.38 mm), but 12×20 US mesh or 0.8 mm to 1.7 mm is preferred. Half-cycle times of 25 s to 30 s are indicated (total cycle times of 50 s to 60 s).

Wankat (Ind. Eng. Chem. Res., 26(8), pp. 1579-1585, 1987) and Rota et al. (AIChE J., 36(9), pp. 1299-1311, 1990) describe the concept of "intensification" whereby decreased particle diameter is employed to produce shorter columns and faster cycles. By non-dimensionalizing the governing mass balance equations for the adsorption process, a set of scaling rules are suggested that preserve the performance of the process in terms of product recovery, purity and pressure drop while increasing the adsorbent productivity. These theoretical results are based upon the similarity of dynamic adsorption behavior. The similarity concept presumes an idealized constant pattern mass transfer front, with the length of the mass transfer zone ($L_{MTZ}$) directly proportional to the square of the particle diameter when pore diffusion is controlling.

U.S. Pat. No. 6,500,234 (Ackley et al.) describes processes utilizing advanced adsorbents with high intrinsic diffusivities relative to conventional adsorbents. Increased oxygen product recovery was demonstrated by increasing the rates of adsorption/desorption to create higher nitrogen mass transfer coefficients at a fixed pressure ratio. This concept was then applied to achieve very short cycles (e.g., greater than 10 s) and very low bed size factor (BSF) while affecting only minimal decrease in product recovery. Particle diameters of 0.5 mm and larger were considered.

U.S. Pat. No. 6,551,384 (Ackley and Zhong) extends the concepts of U.S. Pat. No. 6,500,234 to small scale medical oxygen concentrators by combining small particles and short beds with high intrinsic diffusivity. Short cycles as low as 4 s were demonstrated to achieve BSF as low as 50 lb/TPDO utilizing a mean particle diameter of 0.55 mm.

Very small adsorbent particles (0.1 mm to 0.8 mm) are necessary for the fast cycles and high specific pressure drop that characterize a special class of processes known as rapid pressure swing adsorption (RPSA). Typical RPSA processes have very short feed steps operating at high feed velocities, include a flow suspension step following the feed step and generally have total cycle times less than 20 s (often less than 10 s). The behavior of the adsorption step is far removed from that in conventional processes wherein the state of the bed is dominated by an equilibrium zone with the remaining small bed length fraction occupied by the mass transfer zone (MTZ), i.e., as determined at the end of adsorption. In contrast, the working portion of the bed in RPSA is primarily mass transfer zone with only a relatively small fraction of the bed operating in equilibrium. The high pressure drop/short cycle combination (wherein the pressure drop is on the order of 12 psi/ft) is necessary to establish an optimum permeability and internal purging of the bed which operates continuously to generate product.

RPSA is clearly a special and distinct class of adsorption processes known in the art. The most distinguishing features of RPSA compared to conventional PSA can be described with respect to air separation for oxygen production. The pressure drop per unit bed length ($\Delta P/L$) is at least an order of magnitude greater and the particle diameter ($d_p$) of the adsorbent is usually less than 0.5 mm in RPSA. Total cycle times are typically shorter and the process steps are different in RPSA. Of these contrasting features, pressure drop and particle size constitute the major differences.

Alpay et al. (Chem. Eng. Sci., 49(18), pp. 3059-3075, 1994) studied the effects of feed pressure, cycle time, feed step time/cycle time ratio and product delivery rate in RPSA air separation for several ranges of particle sizes (e.g., 0.15 mm to 0.71 mm) of 5 A molecular sieve. A relatively long bed (e.g., 1.0 m) with high pressure drop was employed as required for RPSA. Alpay found maximum separation effectiveness (maximum oxygen purity and adsorbent productivity) for particles in the size range 0.2 mm to 0.4 mm.

R. H. Kaplan et al. (AIChE Annual Meeting, Nov. 7, 1989, San Francisco) traced developments in the design of concentrators and selected a RPSA system. Using a three-bed system (bed length of 406 mm) and small adsorbent particles (40×80 beads), the cycle time was reduced to as low as 2.4 s. The oxygen recovery was only about 25%, and the BSF was estimated to be about 200 lbs/tons per day of oxygen (TPDO)

when operating at an adsorption pressure of 30 psig and a pressure ratio of about three. Such a recovery is relatively low compared to conventional VPSA processes that achieve oxygen recovery in the range of 50% to 70%. The pressure drop in this RPSA system was large, about 8 psi/ft at 0.3 m/s superficial velocity compared with 0.1 psi/ft in conventional large oxygen PSA units. The low recovery and high pressure drop result in a concentrator having relatively high power consumption.

Three critical factors of PSA process performance are: (1) adsorbent amount (or bed size factor (BSF) given as pounds of adsorbent per ton of product oxygen produced per day (lb/TPDO); (2) oxygen recovery; and (3) unit power consumption (kW/TPDO). Fast cycles are a path to reduce bed size which affects both the adsorbent and vessel costs. However, such a strategy is also accompanied by a tendency toward lower product recovery, higher pressure drop and increased power consumption. In the past, attempts to solve this problem included simply decreasing particle size (U.S. Pat. No. 5,122,164), intensification (Wankat et al.) or adsorbent rate enhancement (U.S. Pat. No. 6,500,234 and U.S. Pat. No. 6,551,384). All of these methods suffer from higher pressure drop. A somewhat different approach is represented by RPSA. Although very short cycles are employed with small particles and relatively long beds, RPSA processes are driven by high pressure drop and are generally characterized by low product recovery and high power consumption.

As discussed herein, the present invention avoids or minimizes the limitations of the previously known processes by first recognizing a change in the adsorption rate-limiting mechanism from pore diffusion to axial dispersion as a function of adsorbent particle size and process operating conditions. The objectives of the present invention are satisfied by selecting the proper combination of particle size, bed depth and cycle time.

SUMMARY OF THE INVENTION

The present invention teaches high frequency pressure swing adsorption (PSA), vacuum swing adsorption (VSA) and transatmospheric adsorption (VPSA) processes, hereinafter referred to collectively as "PSA" processes, that enable very compact beds applicable to a wide range of cyclic adsorption processes from small to large scale. It is aimed to maximize performance in a region where the axial dispersion is an important mass transfer mechanism. Key characteristics of the present invention include the following:

Fast cycle times of less than 4 s (i.e., cycle frequency defined as 1/cycle time>0.25 Hz).

The use of small particles in combination with short bed lengths, wherein the ratio of bed length L to mean particle diameter squared $d_p^2$ is greater than or equal to 5 mm$^{-1}$ and less than or equal to 10,000 mm$^{-1}$ (5 mm$^{-1}$ ≤ L/$d_p^2$ ≤ 10,000 mm$^{-1}$), most preferably greater than or equal to 200 mm$^{-1}$ and less than or equal to 600 mm$^{-1}$ (200 mm$^{-1}$ ≤ L/$d_p^2$ ≤ 600 mm$^{-1}$).

A preferred mean particle diameter of greater than 100 μm and less than or equal to 500 μm (100 μm<$d_p$≤500 μm), more preferably greater than or equal to 150 μm and less than or equal to 350 μm (150 μm≤$d_p$≤350 μm).

In the case of air separation for the production of oxygen, advanced adsorbents of Type X are preferred, with LiX being more preferred and LiX (SiO$_2$/Al$_2$O$_3$=2.0) being most preferred.

In the case of air separation for the production of oxygen, BSF of less than 50 lb/TPDO is achieved using a mean particle diameter of greater than 100 μm and less than or equal to 500 μm (100 μm<$d_p$≤500 μm), in combination with a bed length of less than 100 mm (L<100 mm).

In the case of air separation for the production of oxygen, oxygen recovery of greater than 25% (>25%) is preferred, and greater than 50% (>50%) is most preferred.

The early art for conventional PSA processes implemented small particles to improve process performance without regard to increased pressure drop. Successive improvements to such a strategy included intensification by decreasing particle size and bed length together and the use of advanced adsorbents with high intrinsic diffusivity combined with intensification. The previous art typically ignored or was unaware that the rate-controlling mechanism begins to shift from pore diffusion to axial dispersion for particle diameters decreasing below about 1.0 mm, resulting in pressure drop increasing at a rate disproportionately higher than the gain in mass transfer rate coefficient.

Although the present invention and RPSA processes have in common the use of small particles and fast cycles, the present invention avoids the high pressure drop and long bed depths necessary to the operation of RPSA. Low product recovery and high power consumption are also characteristics of RPSA systems. The present invention achieves high product recovery, low bed size factor, low power and low overall pressure drop relative to RPSA.

The present invention overcomes the limitations of conventional PSA, as well as those of RPSA systems in order to implement compact (short bed length), high frequency (>0.25 Hz) processes with very low BSF. This is accomplished by considering the effects of axial dispersion along with particle size to identify the proper combination of cycle time, particle size and bed length in such a way to maintain the low pressure drop and high product recovery achieved in conventional PSA processes of lower frequency (typically <<1.0 Hz).

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION

Figure 1:
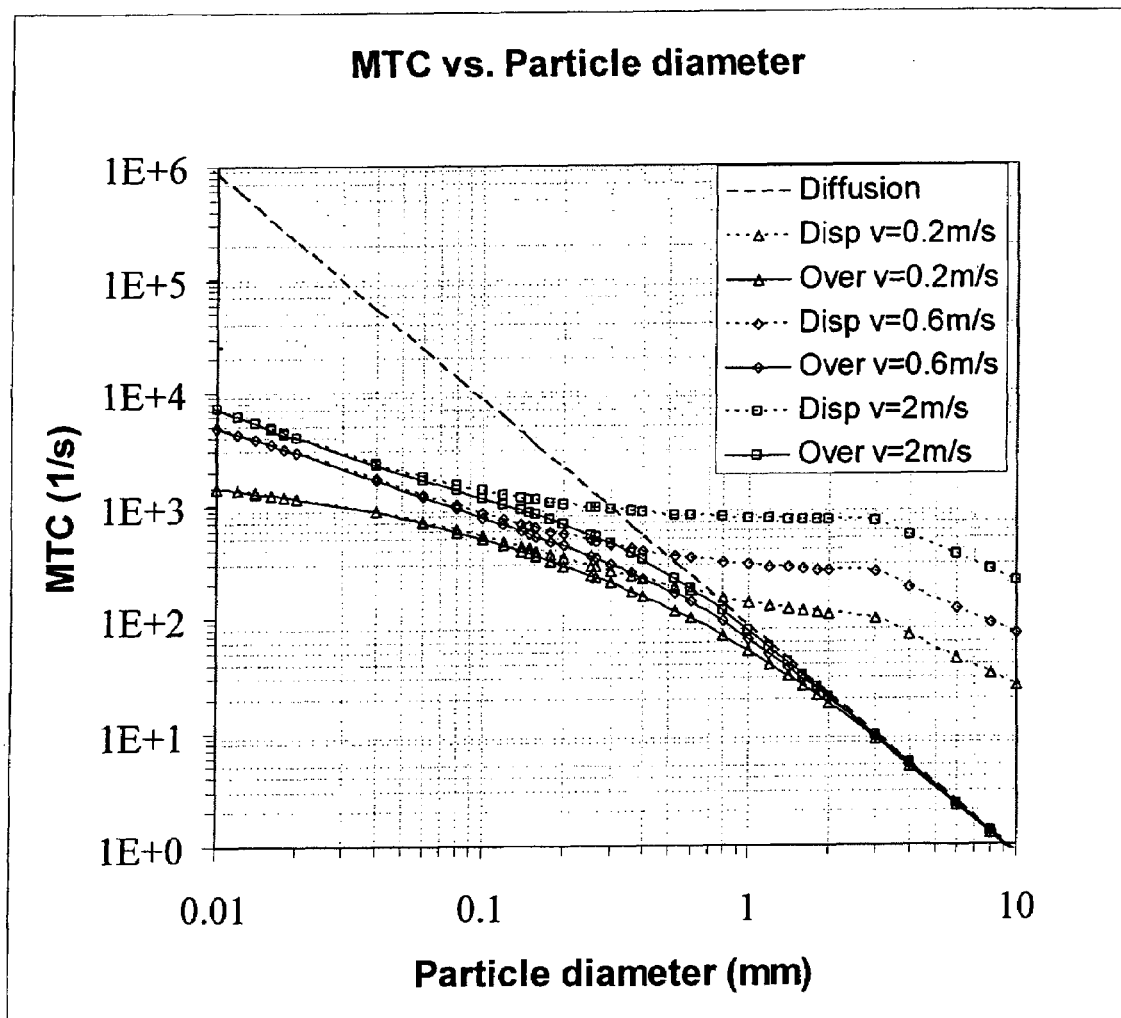
FIG. 1 is a graph illustrating the effects of diffusion and axial dispersion on the overall mass transfer coefficient (and its axial dispersion and pore diffusion components) as a function of particle diameter at different velocities.

It is understood that most adsorbents are typically produced and supplied as particles distributed over a specified range of diameters. For the purpose of this invention, "particle size" is the mean particle diameter $d_p$ of an adsorbent particle size distribution. "Oxygen recovery" is defined as the ratio of contained oxygen product divided by the total oxygen content of the feed. "Unit power consumption" is defined as the power consumed per unit of oxygen produced.

The performance of PSA processes depends on the mass transfer rate (kinetic) and thermodynamic (equilibrium) properties of the adsorption bed. The differential mass balance can be described by axially dispersed plug flow as follows:

$$-D_L \frac{\partial^2 c_i}{\partial z^2} + \frac{\partial}{\partial z}(vc_i) + \frac{\partial c_i}{\partial t} + \left(\frac{1-\varepsilon}{\varepsilon}\right)\frac{\partial q_i}{\partial t} = 0 \qquad \text{(Equation 1)}$$

where $D_L$ is the axial dispersion coefficient for the bed, $c_i$ is the gas phase concentration of the species i, v is the interstitial gas velocity in the bed, $\varepsilon$ is the porosity of the bed, and $q_i$ is the adsorbed phase concentration of the species i. The kinetics of mass transfer in the particle is normally described by gas phase diffusion in the macropores among adsorbent crystals (or microparticles) in the bead or pellet, and adsorbed phase diffusion in the micropores of the crystal (or microparticle). For simplicity, however, PSA processes are commonly simulated by assuming plug flow (i.e., $D_L$=0) in the bed and a lumped linear driving force (LDF) kinetic model:

$$\frac{\partial q_i}{\partial t} = MTC_{over,i}(c_i - c_i^*) \qquad \text{(Equation 2)}$$

where $c_i^*$ is the concentration of the gas species i inside the particle in equilibrium with the zeolite crystals, and $MTC_{over,i}$ is the overall mass transfer coefficient of the gas species in the bed that represents the conventional adsorption mass transfer rates within the adsorbent particle, (e.g., as described in U.S. Pat. No. 6,500,234) and the axial dispersion in the bed. The axial dispersion coefficient ($D_L$) can be approximated by methods known in the art (see e.g., D. M. Ruthven, *Principles of Adsorption and Adsorption Processes*, Wiley-Interscience, 1984 at pp. 208-211).

In order to demonstrate the effects of pore diffusion and axial dispersion upon the overall kinetics of the process, the material balance can be simplified and transformed using the moments analysis. Such an analysis assumes a linear isotherm, an isothermal process and a single adsorbable component. Details of such analysis have been described in the art (e.g., Ruthven, pp. 242-244). Such an analysis results in an overall mass transfer coefficient that includes both the effects of axial dispersion and mass transfer resistance. Mass transfer resistance includes the linearly additive terms representing external film, micropore and macropore resistances. The result represents an extension of the Glueckauf approximation from which the simplified LDF model originates (E. Glueckauf, *Trans. Faraday Soc.* 51, 1540, 1955). For the purpose of the present analyses, the micropore and external film resistances can be assumed to be negligible. This is often the case for air separations, where the overall kinetics of mass transfer is normally controlled by the gas diffusion in the macropores. Thus, only the two most critical mechanisms are considered as an example in the present invention: the macropore diffusion and axial dispersion.

The overall mass transfer coefficient $MTC_{over}$ for each species can then be represented:

$$\frac{1}{MTC_{over}} = \qquad \text{(Equation 3)}$$

$$\frac{1}{MTC_{disp}} + \frac{1}{MTC_{diff}} = \frac{D_L}{v^2}\left(\frac{1-\varepsilon}{\varepsilon}\right) + \frac{d_p^2}{60\varepsilon_p(1-\varepsilon)D_p}$$

where $\varepsilon_p$ is the void fraction inside the adsorbent particle (or macropore porosity) and $D_p$ is the macropore diffusivity of the corresponding gas component for the adsorbent. $MTC_{disp}$ is the axial dispersive mass transfer contribution in the bed and $MTC_{diff}$ is the diffusive mass transfer contribution within the particle.

Since the PSA process is typically nonlinear and non-isothermal, the mass transfer rate correlation in Equation 3 serves as a qualitative guide only. The relative importance of the different mechanisms represented in Equation 3 is illustrated as a function of particle diameter in FIG. 1 using nitrogen diffusing into a zeolite (LiX 2.0) particle as an example. The straight line on the log-log plot of FIG. 1 represents the second term (macropore diffusion) in Equation 3, for which $MTC_{diff}$ is inversely proportional to $d_p^2$. This term does not depend upon the gas velocity. In contrast, the axial dispersion term ($MTC_{disp}$) is much less dependent upon $d_p$ (dependency upon $d_p$ is implicit through $D_L$) but is proportional to the square of the interstitial flow velocity ($v^2$). FIG. 1 represents the two individual MTC components of Equation 3, as well as their sum ($MTC_{over}$). When comparing the components $MTC_{disp}$ and $MTC_{diff}$ at a fixed particle diameter, the smaller-value MTC component identifies the mechanism contributing most to the mass transfer resistance.

For the velocity of 0.64 m/s, FIG. 1 shows that the overall mass transfer coefficient is dominated by pore diffusion for particle diameter greater than 1 mm ($d_p$>1 mm), i.e., the $MTC_{over}$ is inversely proportional to $d_p^2$ (as illustrated by the nearly straight line region between 1 to 10 mm). This condition is typical of most commercial PSA processes. As the particle diameter decreases below 1.0 mm at this flow velocity, however, the mass transfer resistance from pore diffusion decreases and the contribution of axial dispersion becomes important and eventually is dominant. This is evident in the fact that $MTC_{over}$ no longer scales with $1/d_p^2$. Since axial dispersion dominates at these conditions, the strategy employed in the previous art of manipulating parameters affecting pore diffusion (i.e., $D_p$, $d_p$ and/or $\varepsilon_p$) to increase $MTC_{over}$ is no longer valid. Since the axial dispersion and thus $MTC_{over}$ depends on the interstitial velocity of gas through the bed, two other velocities (0.22 m/s and 2 m/s) were selected to show the influence of flow. As evident in FIG. 1, the particle size region for which pore diffusion dominates extends to smaller particle diameters as the flow velocity increases, i.e., approximate straight-line region of $MTC_{over}$ extends to smaller particle sizes.

A disadvantage of decreasing the adsorbent particle size in PSA beds is the increase of the pressure drop across a given length of bed ($\Delta P/L$). The pressure drop per unit length scales roughly with the inverse of the particle diameter squared ($\Delta P/L \propto 1/d_p^2$). When pore diffusion is controlling, pressure drop and the overall mass transfer coefficient are both inversely proportional to the square of the particle diameter. For example, reducing adsorbent particle diameter $d_p$ from 2 mm to 1 mm would increase the pressure drop by a factor of four. Since the overall mass transfer rate $MTC_{over}$ is controlled by macropore diffusion within the particle at these sizes, $MTC_{over}$ would also increase by a factor of four. To compensate for the increase in pressure drop ΔP, the bed length L can be reduced by a factor of four while maintaining approximately the same ratio of mass transfer zone length to bed length as in the case of longer bed length combined with larger particle diameter. The overall pressure drop ΔP and power consumption would remain approximately unchanged. Such strategies are termed "intensification" as described by Wankat (1987) and Rota (1990).

Figure 2:
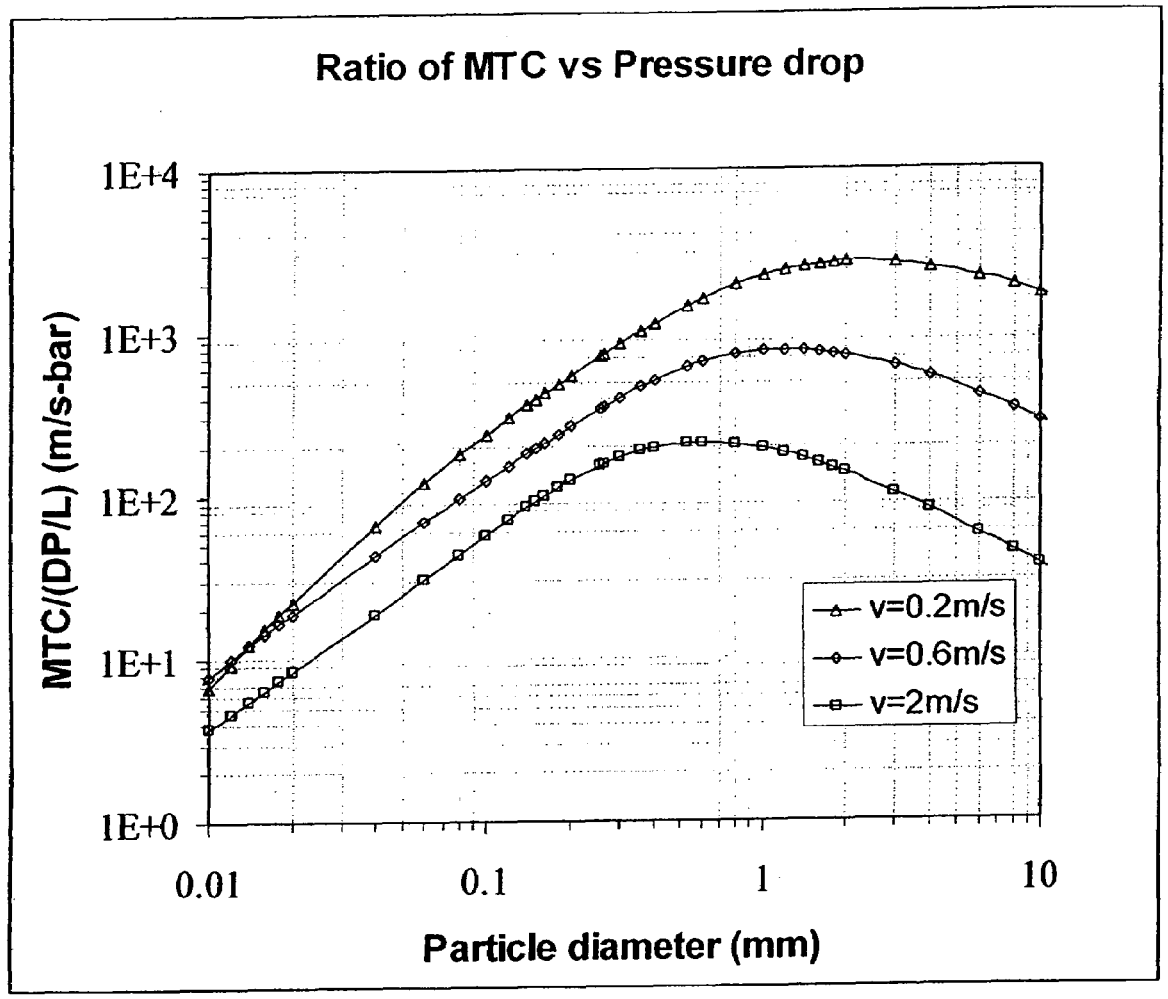
FIG. 2 is a graph illustrating the ratio of MTC$_{over}$/(ΔP/L) as function of particle diameter.

When the axial dispersion dominates, the situation is entirely different, i.e., the changes in pressure drop and mass transfer coefficient no longer follow a similar dependence upon particle size. While the pressure drop ΔP continues to increase in proportion to $1/d_p^2$, the increase in overall mass transfer rate $MTC_{over}$ with decreasing particle size relaxes considerably as the effects of pore diffusion become less important. FIG. 2 ($MTC_{over}/(ΔP/L)$ vs. $d_p$) demonstrates these effects for various bed velocities. The ratio $MTC_{over}/(ΔP/L)$ reaches a maximum value at particle diameter $d_p$ range 0.3-4 mm, depending on the flow velocity. This parameter ratio decreases with increasing particle size $d_p$ to the right of its maximum because of the increasing effect of intraparticle diffusion. $MTC_{over}/(ΔP/L)$ also rapidly decreases with decreasing $d_p$ (to the left of the maximum) as the effects of axial dispersion become more dominant. The particle diameter at which this controlling mechanism shift (from diffusion to axial dispersion) occurs depends upon the velocity, i.e., this transition diameter (diameter at which $MTC_{over}/(ΔP/L)$ is a maximum) decreases with increasing flow velocity. For example, as illustrated in FIG. 2, the particle diameter $d_p$ at transition is close to about 2.0 mm at the lower velocity of 0.22 m/s; while the transition diameter is about 0.5 mm at a higher velocity of 2.0 m/s. This transition from diffusion to dispersion dominance occurs at a particle diameter at which the pressure drop ΔP begins to increase faster than the overall mass transfer rate $MTC_{over}$, i.e., as the particle diameter decreases. In such regimes, the pressure drop can no longer be offset by smaller bed length without negatively affecting separation performance, i.e., the increase in mass transfer coefficient achieved from decreased particle size is insufficient to maintain a constant ratio of the mass transfer zone length to the overall bed length. As a result, product recovery decreases while BSF and unit power increase. The PSA process should be designed to operate within the range where the ratio of MTC to pressure drop ($MTC_{over}/(ΔP/L)$) is near its maximum in order to achieve the best overall process performance.

The characteristics shown in FIGS. 1 and 2 were developed on the basis of simplified models for the purpose of investigating the relative effects of axial dispersion and pore diffusion as a function of particle size. Such qualitative results can be tested in real systems by employing more detailed models applied to real PSA processes. Process performance can be determined from process simulation using an appropriate set of detailed model equations. The process model utilized here is similar to that applied in U.S. Pat. No. 6,551,384, incorporated herein in its entirety. However, two key changes are made to this model: incorporate axial dispersion effects and represent adsorption rate more accurately for pore diffusion in very fast cycles.

Traditionally, the lumped mass transfer rate in an adsorbent bed could be approximated by a LDF model, as shown in Equation 2. There are several reasons for employing this model: simplicity, computing The effective intraparticle solid diffusivity $D_e$ for $N_2$ of the exemplary adsorbent (as used in Equation 4) is estimated from its corresponding intraparticle gas diffusivity $D_p$. $D_p$ is determined from a combination of experiment and modeling utilizing a breakthrough test similar to that described in U.S. Pat. No. 6,551,384. Values of $D_e$ equal to $5×10^{-7}$ m²/s and $3.3×10^{-7}$ m²/s have been estimated for $N_2$ and $O_2$, respectively, for the LiX(2.0)cd described above. However, the invention is not limited to this particular adsorbent.

The process steps of an advanced oxygen VPSA cycle (as described in U.S. Pat. No. 6,551,384 and incorporated by reference herein) are chosen here to illustrate the invention, although the invention can be applied to a variety of process steps and cycles. This cycle operates with a continuous feed and consists of six short-cycle steps. The six steps are given as follows:

1. simultaneous feed and product pressurization,
2. adsorption,
3. equalization,
4. blowdown/evacuation,
5. evacuation and purge,
6. simultaneous equalization and feed.

This process is used as the baseline process. Key process information includes: LiX2.0cd adsorbent having a $SiO_2/Al_2O_3$ ratio of about 2.0, bed length (L) of about 100 mm, average adsorbent particle diameter of 528 μm, pressure ratio ($P_H/P_L$) of 3.0 ($P_L$=0.5 bara, efficiency and reasonable approximation for most current PSA processes. However, as the particle size, velocity and cycle time decrease, the LDF model becomes less accurate in representing the overall mass transfer rate in an adsorbent bed and more rigorous methods must be employed. A more fundamental approach based on a solid phase diffusion model (e.g., as available in the ADSIM® simulation module) is applied:

$$\frac{\partial q_i}{\partial t} = (D_e)_i \left[ \frac{2}{r} \frac{\partial q_i}{\partial r} + \frac{\partial^2 q_i}{\partial r^2} \right] \quad \text{(Equation 4)}$$

where $(D_e)_i$ is the effective intraparticle solid phase diffusivity of species i and r is the particle radial coordinate. Equation 4 is then solved in conjunction with Equation 1 for the material balance for each gas species. Both the effects of axial dispersion and pore diffusion are thus included using this model configuration.

Example 1

An exemplary advanced air separation process may use an adsorbent such as LiX(2.0) with approximately 12% binder, treated with caustic digestion (cd) prior to Li exchange to convert the binder to zeolite. This adsorbent has a void fraction or porosity of $\epsilon_p$=0.35, an average particle diameter of $d_p$=2.0 mm, a $N_2$ mass transfer coefficient of $MTC_{N2}$=18 s$^{-1}$ and a $N_2$ effective pore diffusivity $D_{pN2}$=5.5×10$^{-6}$ m²s (hereinafter referred to as LiX(2.0)cd; see Sample S-2 in U.S. Pat. No. 6,500,234). $P_H$=1.5 bara), air feed flow of 15 mol/m²s (or interstitial velocity of approximately 0.69 m/s). Process performance for this cycle includes: oxygen product purity of 90%, cycle time of 4 s, BSF=50 lb/TPDO and oxygen recovery=60%.

The processes of the present invention are developed and demonstrated in reference to the baseline process using the cycle steps described above. The bed length L and cycle time are varied simultaneously with the adsorbent particle diameter $d_p$. The bed length L is decreased with decreasing particle size to maintain roughly the same pressure drop through the bed, i.e., the bed length L is closely proportional to $1/d_p^2$. Cycle time and individual step times are adjusted accordingly to achieve the best process performance, e.g., highest productivity (or smallest bed size factor), maximum oxygen recovery and lowest power consumption for a given product purity (90%). However, the optimum performance will be determined by economic criteria such as overall product cost, capital cost and/or cost of power. Driven by such economic factors, the optimum performance often results in maximizing one or more individual process performance parameters at the expense of the remaining process performance metrics. The preferred particle size range obtained in the present invention may differ according to the desired product purity, but the principles and methodology of the present invention remain unchanged.

Example 2

Figure 3A:
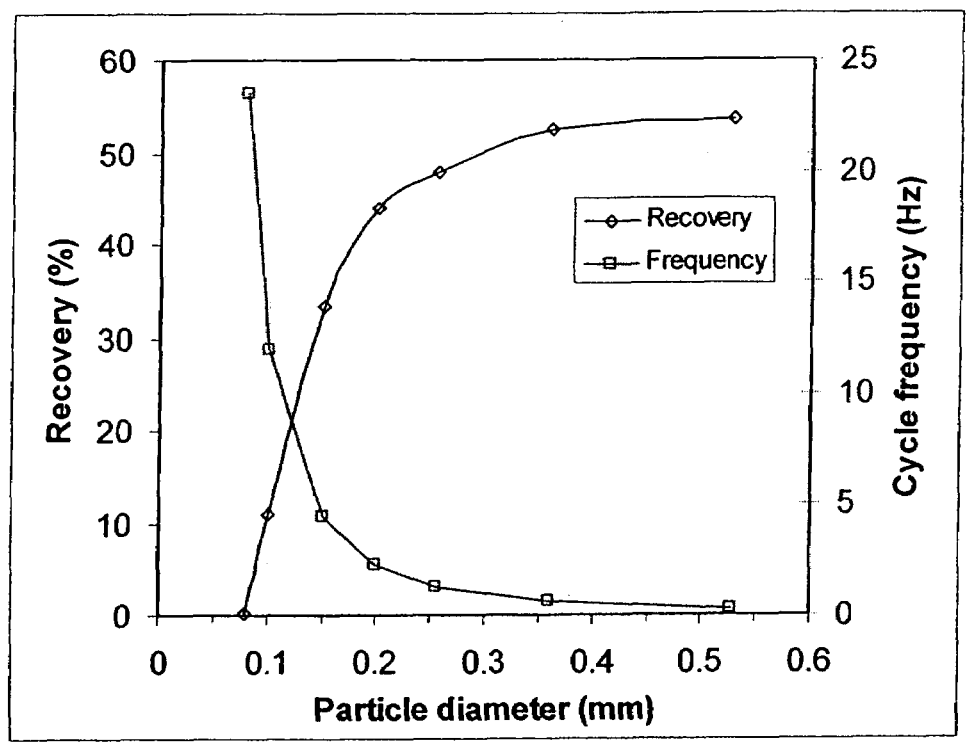
FIG. 3a is a graph illustrating oxygen recovery as a function of particle diameter.

The present invention is demonstrated by simulation of the baseline process using the process model described above and by varying the particle diameter, bed length and cycle time. The simulation results are summarized in FIGS. 3a and 3b. It is clear that as the particle size and cycle time decrease (or cycle frequency increases), process performance decreases. Oxygen recovery initially plateaus at larger particle sizes and then decreases with decreasing particle diameter (FIG. 3a). The bed size factor (BSF), given as pounds of adsorbent per ton of product oxygen produced per day (lb/TPDO), is inversely proportional to the productivity and decreases initially with particle diameter but then increases at smaller particle diameters as the reduction in oxygen recovery begins to overwhelm the benefits of shorter bed length (FIG. 3b).

Power is computed as the theoretical adiabatic power as described in the textbook by J. M. Coulson and J. F. Richardson (*Coulson & Richardson's Chemical Engineering Volume 1*, Butterworth-Heinemann 1990 at p. 288). The computed theoretical power is used here since actual power consumption is affected by the scale of the process, choice of mechanical compression equipment, choice of power drive system and power source, e.g., resulting in potential large variations in both compressor and motor (or battery) efficiencies. Unit power is determined by dividing the theoretical power by the amount of product produced. This unit power is then normalized to the corresponding adiabatic theoretical power of the baseline oxygen process. The normalized unit power consumption increases with the decreasing particle size as shown in FIG. 3b, reflecting the effects of diminishing product oxygen recovery. The normalized power provides a reasonable guide to the selection of conditions to achieve minimum unit power for the process.

Figure 3B:
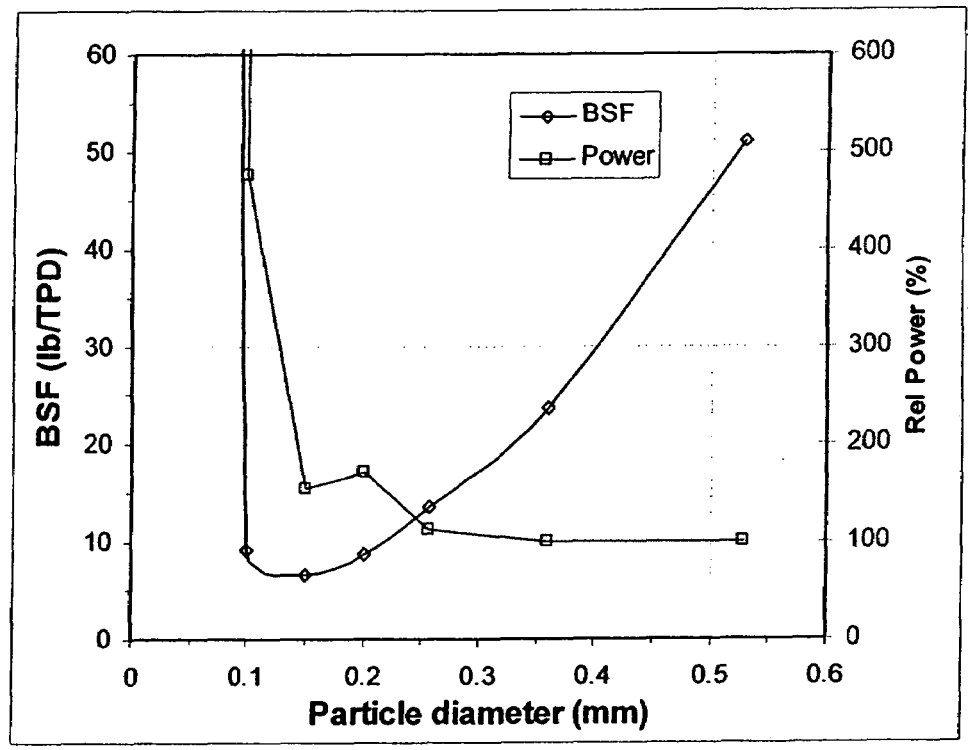
FIG. 3b is a graph illustrating BSF and relative power (the ratio of theoretical power to baseline theoretical power) as function of particle diameter.

FIGS. 3a and 3b provide guidance to the preferred particle size range for PSA oxygen separation. For example, if the BSF is the primary concern (small BSF or high adsorbent productivity (inverse of BSF)), the preferred particle diameter is greater than 100 μm and less than or equal to 500 μm (100 μm<$d_p$≦500 μm), more preferably greater than 100 μm and less than or equal to 250 μm (100 μm<$d_p$≦250 μm). However, if unit power consumption is the primary concern, then relatively larger particles of greater than 250 μm and less than or equal to 500 μm (250 μm<$d_p$≦500 μm) will be preferred. Power can represent as much as 50% of the total PSA process cost, so a balance between productivity and power consumption may be desirable depending upon the economic driving forces for the application. For example, such a balance between BSF and unit power could be achieved in a preferred particle size range (e.g., 150 μm<$d_p$≦350 μm). These simulation results illustrate the process improvements of the present invention compared to the baseline process. Under similar oxygen recovery and power consumption, BSF could be reduced by nearly a factor of 5, i.e., from 50 lb/TPDO for the baseline process to about 10 lb/TPDO as shown in FIG. 3b. Correspondingly, productivity per lb of adsorbent would be increased by nearly 5 times. These results provide guidance for determining preferred particle size ranges, and BSF could be reduced much further if recovery and power consumption are not primary concerns.

Similarly, it is also possible to define a preferred bed length in relation to the adsorbent particle size. This strategy could be taken to ensure maximum capacity of the adsorbent, e.g., particularly important when the cost of the advanced adsorbent is high compared to more conventional adsorbents. Alternatively, adsorbent capacity may be balanced relative to maintaining low pressure drop across the bed and minimizing unit power consumption. Such a balance is achieved by insuring that the bed length is long enough relative to the mass transfer zone length, but short enough to minimize the effects of pressure drop and unit power. Based upon the simulation results for the example case, the preferred range is defined by the ratio of bed length (L) to the particle diameter squared ($d_p^2$), i.e., 5 mm$^{-1}$<$L/d_p^2$<10,000 mm$^{-1}$ and more preferably, 200 mm$^{-1}$<$L/d_p^2$<600 mm$^{-1}$.

Example 3

Figure 4A:
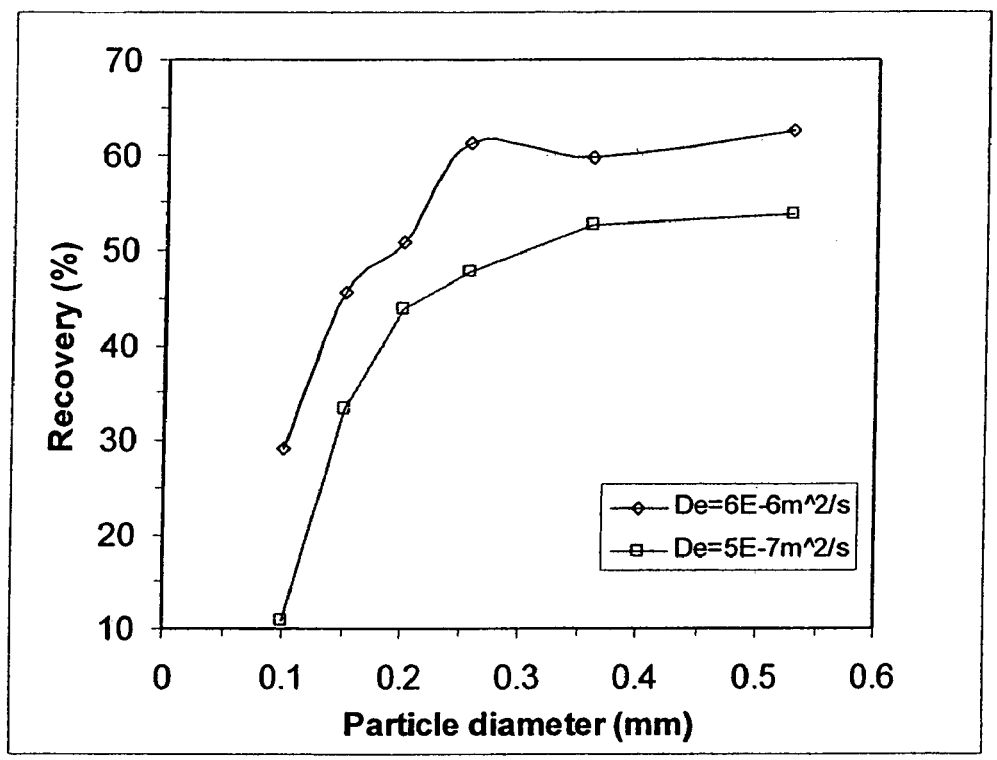
FIG. 4a is a graph illustrating oxygen recovery as a function of particle diameter at two different effective diffusivities.
Figure 4B:
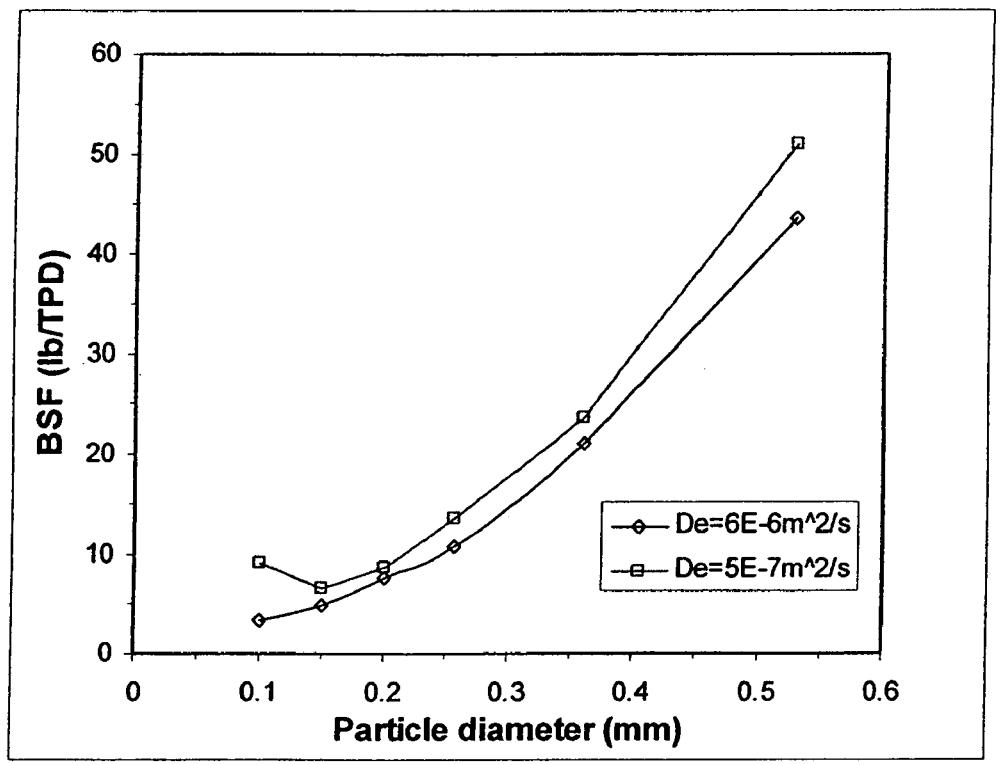
FIG. 4b is a graph illustrating BSF as function of particle diameter at two different effective diffusivities.

To examine the influence of macropore diffusion within the particle on the preferred particle sizes, the effective solid phase diffusivity for nitrogen employed in the simulations ($D_e$) is increased from 5×10$^{-7}$ to 6×10$^{-6}$ m$^2$/s. The resultant recovery and BSF are compared in FIGS. 4a and 4b, respectively. The increased diffusivity (6×10$^{-6}$ m$^2$/s) results in higher oxygen recovery and lower BSF for a given mean particle diameter. Thus, the increased adsorbent intrinsic diffusivity offsets or delays the increasing effects of axial dispersion as particle diameter decreases. This advantage translates to smaller systems (shorter beds) operating at high frequency.

The principles of this invention apply to any fixed bed separation or purification processes, particularly for bulk separations utilizing compact beds and high frequency cycles. While the invention is particularly well suited to air separation, it is equally applicable to other types of gas separations.

The system, although presented here as a two-bed embodiment, could be practiced with one bed or more than two beds. The invention can be practiced utilizing a variety of bed/flow configurations such as axial, radial, lateral, etc.

The invention is not restricted to a single adsorbent, nor is it limited to nitrogen-selective adsorbents. The invention is applicable to other types of adsorbents such as Type X, Type Y and Type A zeolites and clinoptilolite, mordenite, chabazite, activated carbon and alumina. In the case of air separation, Type X nitrogen-selective exchanged with Li, Ca, Na are particularly suitable. Furthermore, the invention applies to adsorbents used in various configurations such as layers and/or mixtures of different adsorbents, composite adsorbents, all of which may be contained in a vessel in a constrained or unconstrained manner.

This invention is not restricted to a conventional packed bed PSA, but applies to adsorbents configured or distributed in thin layers having a thickness or bed length of only a few particle diameters. In such configurations applicable to the present invention, the gas to be separated flows entirely through the layer of particles from inlet to outlet. Examples include structured adsorber designs such as monoliths, polyliths, porous substrates coated with adsorbent and the like.

Although the invention has been described in detail with reference to certain preferred embodiments, those skilled in the art will recognize that there are other embodiments within the spirit and the scope of the claims.

What is claimed is:

1. A process for the separation of a selectively adsorbable component from a gas mixture comprising such selectively adsorbable component and at least one less selectively adsorbable product component, wherein the process uses at least one adsorbent bed containing adsorbent material, the ratio of bed length (L) to mean particle diameter squared of the adsorbent material ($d_p^2$) is greater than or equal to 5 mm$^{-1}$ and less than or equal to 10,000 mm$^{-1}$, and said process comprises the steps of:
   (a) adsorption of said selectively adsorbable component from said gas mixture onto said at least one adsorbent bed;
   (b) recovery of said at least one less selectively adsorbable product component from said gas mixture, wherein the recovery is at least 50%; and
   (c) desorption of said selectively adsorbable component from said at least one adsorbent bed;
   wherein the cycle frequency is greater than 0.25 Hz.

2. The process of claim 1, wherein the ratio of bed length (L) to mean particle diameter squared of the adsorbent material ($d_p^2$) is greater than or equal to 200 mm$^{-1}$ and less than or equal to 600 mm$^{-1}$.

3. The process of claim 1, wherein the mean particle diameter of the adsorbent material ($d_p$) is greater than 100 μm and less than or equal to 500 μm.

4. The process of claim 1, wherein the mean particle diameter of the adsorbent material ($d_p$) is greater than 150 μm and less than or equal to 350 μm.

5. The process of claim 1, wherein the at least one less selectively adsorbably product component is oxygen.

6. The process of claim 5, wherein the adsorbent material comprises adsorbent of Type X.

7. The process of claim 6, wherein the adsorbent material is LiX.

8. The process of claim 7, wherein the adsorbent material is LiX having a $SiO_2/Al_2O_3$ ratio equal to 2.0.

9. The process of claim 3, wherein the bed length (L) is less than 100 mm.

10. A process for the production of oxygen comprising the separation of a selectively adsorbable component from a gas mixture comprising such selectively adsorbable component and oxygen, wherein the process uses at least one adsorbent bed containing adsorbent material, the adsorbent material is a Type X material, the bed size factor is less than 50 lbs/tons per day of oxygen, the mean particle diameter ($d_p$) is greater than 100 μm and less than or equal to 500 μm, the bed length (L) is less than 100 mm and the ratio of bed length (L) to mean particle diameter squared of the adsorbent material ($d_p^2$) is greater than or equal to 5 mm$^{-1}$ and less than or equal to 10,000 mm$^{-1}$ and said process comprises the steps of:
   (a) adsorption of said selectively adsorbable component from said gas mixture onto said at least one adsorbent bed;
   (b) recovery of oxygen from said gas mixture, wherein the recovery is at least 25%; and
   (c) desorption of said selectively adsorbable component from said at least one adsorbent bed;
   wherein the cycle frequency is greater than 0.25 Hz.

11. A system for the production of oxygen comprising the separation of a selectively adsorbable component from a gas mixture comprising such selectively adsorbable component and oxygen, comprising at least one adsorbent bed containing adsorbent material, wherein the adsorbent material is a Type X material, the bed size factor is less than 50 lbs/tons per day of oxygen, the mean particle diameter ($d_p$) is greater than 100 μm and less than or equal to 500 μm, the bed length (L) is less than 100 mm and the ratio of bed length (L) to mean particle diameter squared of the adsorbent material ($d_p^2$) is greater than or equal to 5 mm$^{-1}$ and less than or equal to 10,000 mm$^{-1}$.

12. A system for the separation of a selectively adsorbable component from a gas mixture comprising such selectively adsorbable component and at least one less selectively adsorbable product component, comprising at least one adsorbent bed containing adsorbent material, wherein the ratio of bed length (L) to mean particle diameter squared of the adsorbent material ($d_p^2$) is greater than or equal to 200 mm$^{-1}$ and less than or equal to 600 mm$^{-1}$.

* * * * *